UNITED STATES PATENT OFFICE.

JAMES CLEGG, OF BALTIMORE, MD., ASSIGNOR, BY MESNE ASSIGNMENTS, TO JOHN A. IVES AND JAMES H. IVES, OF SAME PLACE.

IMPROVEMENT IN COMPOUNDS FOR PREVENTING INCRUSTATION IN BOILERS.

Specification forming part of Letters Patent No. 172,390, dated January 18, 1876; application filed July 30, 1875.

*To all whom it may concern:*

Be it known that I, JAMES CLEGG, of the city of Baltimore and State of Maryland, have invented a new and useful Compound for Removing Scale and other Deposit from Steam-Boilers, which compound is fully described in the following specification.

This invention relates to a compound to be mixed with the water in the boiler; and consists in a mixture of ten parts of bone-black, seven parts of sulphate of copper, sixty parts of soda-ash, and twenty-three parts of black-oak bark. To prepare the compound take the ingredients separately, and, after reducing them to impalpable powder, mix them thoroughly together, with or without the addition of a small quantity of water. The compound is now ready for use, and may be mixed with the feed-water or introduced directly to the boiler. The effect of the compound is to loosen and detach the scale from the boiler-surfaces, and not to reduce the scale to a powder by a lengthy process. I usually regulate the quantity to be used in a boiler by the horse-power thereof, allowing about four ounces of the compound per horse-power.

My compound is now in extensive use, and is endorsed by steam-users as fully answering the purpose for which it is intended.

What I claim as new, and desire to secure by Letters Patent of the United States, is—

A compound, consisting of bone-black, sulphate of copper, soda-ash, and black-oak bark, in combination, and in relative quantities, substantially as specified.

In testimony whereof I have hereunto subscribed my name this 29th day of July, in the year of our Lord 1875.

JAMES CLEGG.

Witnesses:
 WM. T. HOWARD,
 W. W. WHARTON.